(12) United States Patent
Garavaglia et al.

(10) Patent No.: US 8,997,165 B2
(45) Date of Patent: Mar. 31, 2015

(54) METHODS AND SYSTEMS FOR ALLOCATING RESOURCES IN A NETWORK WITH OPTICAL AND COAXIAL COMPONENTS

(75) Inventors: Andrea Garavaglia, Nuremberg (DE); Juan Montojo, Nuremberg (DE); Christian Pietsch, Nuremberg (DE); Stephen J. Shellhammer, San Diego, CA (US); Nicola Varanese, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 13/609,198

(22) Filed: Sep. 10, 2012

(65) Prior Publication Data

US 2013/0239165 A1 Sep. 12, 2013

Related U.S. Application Data

(60) Provisional application No. 61/607,539, filed on Mar. 6, 2012.

(51) Int. Cl.
*H04N 7/173* (2011.01)
*H04N 21/61* (2011.01)

(52) U.S. Cl.
CPC .................................. *H04N 21/61* (2013.01)
USPC ........................................................ 725/129

(58) Field of Classification Search
CPC ....................................................... H04N 21/61
USPC ........................................................ 725/129
See application file for complete search history.

(56) References Cited

U.S. PATENT DOCUMENTS

| | | |
|---|---|---|
| 7,301,970 B2 | 11/2007 | Kim et al. |
| 7,551,610 B2 | 6/2009 | Cummings et al. |
| 8,050,562 B2 | 11/2011 | Lee et al. |
| 2007/0250891 A1 | 10/2007 | Weinstein et al. |
| 2009/0296733 A1 | 12/2009 | Yu |
| 2011/0058813 A1 | 3/2011 | Boyd et al. |
| 2011/0078755 A1 | 3/2011 | Dai et al. |
| 2011/0123193 A1 | 5/2011 | Yamanaka et al. |
| 2012/0243872 A1 | 9/2012 | Haran et al. |

(Continued)

FOREIGN PATENT DOCUMENTS

EP 1786149 A1 5/2007

OTHER PUBLICATIONS

International Search Report and Written Opinion—PCT/US2013/027489—ISA/EPO—Jul. 25, 2013.

(Continued)

*Primary Examiner* — Kieu Oanh T Bui
(74) *Attorney, Agent, or Firm* — Mahamedi Paradice LLP

(57) ABSTRACT

A media converter is to be coupled to an optical line terminal via an optical link and to a plurality of coax network units via coax links in a cable plant. The media converter includes an optical physical-layer device to receive and transmit optical signals via the optical link and a coax physical-layer device to receive and transmit electrical signals via the coax links. The media converter also includes an implementation of an optical-coax convergence layer to schedule transmissions of electrical signals from the plurality of coax network units by allocating coax resources among the plurality of coax network units in accordance with resource allocation for the optical link.

26 Claims, 11 Drawing Sheets

(56) References Cited

U.S. PATENT DOCUMENTS

2012/0257892 A1 10/2012 Boyd et al.
2012/0257893 A1 10/2012 Boyd et al.
2013/0004155 A1 1/2013 Liang et al.
2013/0236178 A1 9/2013 Garavaglia et al.

OTHER PUBLICATIONS

McGarry M et al., "Ethernet Passive Optical Network Architectures and Dynamic Bandwidth Allocation Algorithms", IEEE Communications Surveys, IEEE, New York, NY, US, vol. 10, No. 3, Jul. 1, 2008, pp. 46-60, XP011234561, ISSN: 1553-877X, DOI: 10.1109/COMST.2008.4625804.

Sommer J et al., "Ethernet—A Survey on its Fields of Application", IEEE Communications Surveys, IEEE, New York, NY, US, vol. 12, No. 2, Apr. 1, 2010, pp. 263-284, XP011334497, ISSN: 1553-877X, DOI:10.1109/SURV.2010.021110.00086.

Wei S et al., "Test Trial of a New Broadband Access Technology Based on Coaxial Cable Network", Communication Technology (ICCT), 2010 12th IEEE International Conference on, IEEE, Piscataway, NJ, USA, Nov. 11, 2010, pp. 470-472, XP031849909, DOI: 10.1109/ICCT.2010.5688859, ISBN: 978-1-4244-6868-3.

METHODS AND SYSTEMS FOR ALLOCATING RESOURCES IN A NETWORK WITH OPTICAL AND COAXIAL COMPONENTS

RELATED APPLICATION

This application claims priority to U.S. Provisional Patent Application No. 61/607,539, titled "Methods and Systems for Allocating Resources in a Hybrid Fiber-Coaxial Network," filed Mar. 6, 2012, which is hereby incorporated by reference in its entirety.

TECHNICAL FIELD

The present embodiments relate generally to communication systems, and specifically to communication systems with both optical fiber links and coaxial cable ("coax") links.

BACKGROUND OF RELATED ART

A network may use both optical fiber and coaxial cable for respective links. For example, the portions of the network that use optical fiber may be implemented using the Ethernet Passive Optical Networks (EPON) protocol, and the EPON protocol may be extended over coaxial cable plants. EPON over coax is called EPoC. The optical fiber part of the network can potentially support a higher data rate than the coax part of the network. Also, different coax parts of the network (e.g., different cable plants) may have different maximum data rates. Slow coax links thus can limit overall system performance. For example, if the Ethernet Passive Optical Network protocol is implemented in a network with both fiber (EPON) and coax (EPoC) links, the overall data rate may be limited by the lowest data rate of the worst coax link.

In view of these different data rates, there is a need for coordinating resource allocation between the optical fiber and coax parts of the network.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Figure 1:
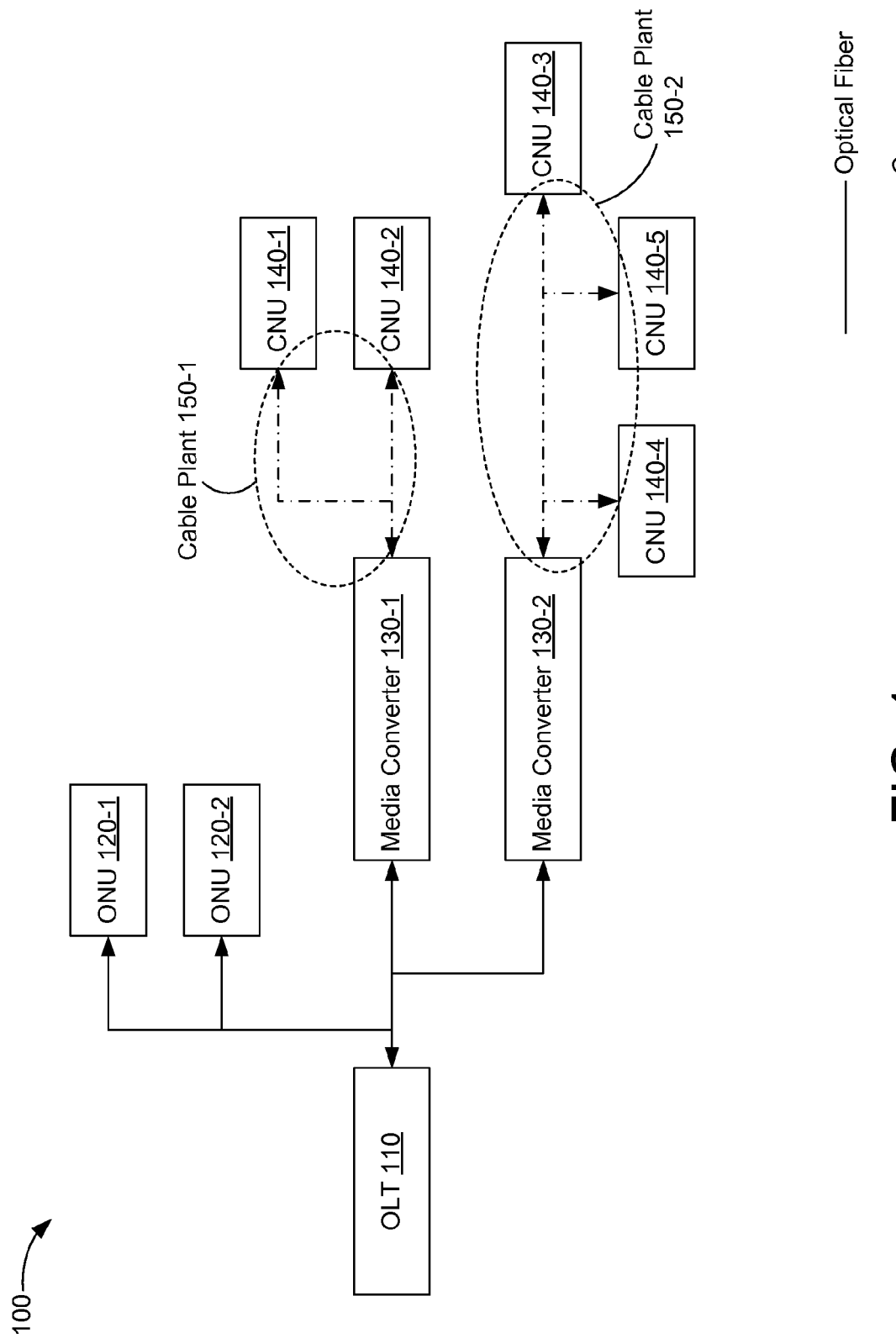
FIG. 1 is a block diagram of a network that includes both optical fiber links and coax links in accordance with some embodiments.

Embodiments are disclosed in which resource allocation (e.g., transmission scheduling and assignment of subcarrier frequencies) is coordinated between optical and coax portions of a network.

In some embodiments, a media converter can be coupled to an optical line terminal (OLT) via an optical link and to a plurality of coax network units (CNUs) via coax links in a cable plant. The media converter includes an optical physical-layer device to receive and transmit optical signals via the optical link and a coax physical-layer device to receive and transmit electrical signals via the coax links. The media converter also includes an implementation of an optical-coax convergence layer to schedule transmissions of electrical signals from the plurality of coax network units by allocating coax resources among the plurality of coax network units in accordance with resource allocation for the optical link.

In some embodiments, a method of operating a media converter coupled to an optical line terminal via an optical link and to a plurality of coax network units via coax links in a cable plant includes receiving and transmitting optical signals via the optical link and receiving and transmitting electrical signals via the coax links. The method further includes scheduling transmission of electrical signals from the plurality of coax network units. The scheduling includes allocating coax resources (e.g., both time and frequency) among the plurality of coax network units in accordance with resource allocation for the optical link.

In some embodiments, a media converter can be coupled to an optical line terminal via an optical link and to a plurality of coax network units via coax links in a cable plant. The media converter includes an optical physical-layer device to receive and transmit optical signals via the optical link and a coax physical-layer device to receive and transmit electrical signals via the coax links using coax resources on the coax links. The media converter also includes one or more processors and memory storing instructions that, when executed by the one or more processors, cause the media converter to schedule transmissions of electrical signals from the plurality of coax network units by allocating coax resources among the plurality of coax network units in accordance with resource allocation for the optical link.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

FIG. 1 is a block diagram of a network 100 that includes both optical fiber links and coax links in accordance with some embodiments. The network 100 includes an optical link terminal (OLT) 110 (which may also be referred to as an optical line terminal) coupled to a plurality of optical network units (ONUs) 120-1 and 120-2 via respective optical fiber links. The OLT 110 also is coupled to a plurality of media converters 130-1 and 130-2 via respective optical fiber links. The media converters 130-1 and 130-2, which may also be referred to as coax media converters (CMCs) or optical-coax units (OCUs), convert optical signals from the OLT 110 into electrical signals and transmit the electrical signals to coax network units (CNUs) via respective coax links. In the example of FIG. 1, a first media converter 130-1 transmits converted signals to CNUs 140-1 and 140-2, and a second media converter 130-2 transmits converted signals to CNUs 140-3, 140-4, and 140-5. The coax links coupling the first media converter 130-1 to CNUs 140-1 and 140-2 compose a first cable plant 150-1. The coax links coupling the second media converter 130-2 to CNUs 140-3 through 140-5 compose a second cable plant 150-2. In some embodiments, the OLT 110, ONUs 120-1 and 120-2, and media converters 130-1 and 130-2 are implemented in accordance with the Ethernet Passive Optical Network (EPON) protocol. In some embodiments, the OLT 110 transmits optical signals using time-domain multiplexing (TDM), such that different time slots are used to transmit packets addressed to different network units.

In some embodiments, the OLT 110 is located at the network operator's headend, the ONUs 120 and CNUs 140 are located at the premises of respective users, and the media converters 130 are located at the headends of respective cable plant operators. Alternatively, media converters 130 may be located within cable plants.

In some embodiments, each ONU 120 and media converter 130 in the network 100 receives data at the same data rate. The ONUs 120 and media converters 130 each receive all of the packets transmitted by the OLT 110. For unicast transmissions, each ONU 120 receives every packet transmitted by the OLT 110, but selects only the packets addressed to it, and discards all packets that are not addressed to it.

For unicast transmissions, the media converters 130 also receive every packet transmitted by the OLT 110, but filter out the packets not addressed to CNUs 140 in their respective cable plants 150. For example, the media converter 130-1 receives every packet transmitted by the OLT 110 but forwards only those packets addressed to the CNUs 140-1 and 140-2 in the cable plant 150-1. The media converter 130-1 forwards each packet addressed to one of the CNUs 140-1 and 140-2 in the cable plant 150-1 to every CNU 140-1 and 140-2 in the cable plant 150-1. Each CNU 140-1 and 140-2 selects the packets addressed to it and discards other packets. The media converter 130-2 and CNUs 140-3 through 140-5 function similarly.

In some embodiments, the optical fiber links in the network 100 can support higher data rates than the coax links. In one example, the optical links can support data rates of 10 Gbps, while the coax links can support data rates of 1 Gbps. Despite this difference, the OLT 110 transmits at the higher data rate of the optical links (e.g., 10 Gbps). The filtering performed by the media converters 130 prevents the coax links from limiting data rates of the optical links and thus the overall network performance. Because only a portion of the packets transmitted by the OLT 110 are forwarded by the media converters 130, the coax links can operate at lower data rates than the optical links, which can operate at their maximum potential speed in accordance with some embodiments. By allowing the optical links to operate at full speed, the filtering thus avoids wasting bandwidth.

In some embodiments, the data rates of respective coax links vary according to link quality and available bandwidth. Even within a particular cable plant 150, different CNUs 140 (and thus, different users) may see different channel conditions. The media converters 130-1 and 130-2 therefore are configurable to transmit coax signals using different modulation and coding schemes (MCSs). For example, different MCSs may be used for different CNUs in a cable plant. (Alternatively, a data rate is chosen such that all CNUs 140 on a cable plant 150 can decode all broadcast packets.) Different multiplexing scheme may be used for different cable links, such as TDM, frequency-division multiplexing (FDM), code-division multiplexing (CDM), and various combinations of such multiplexing schemes.

In some embodiments, an MCS is chosen such that when a code word combines packets for different CNUs 140, all of these CNUs are able to decode the code word.

In some embodiments, as mentioned, MCSs are chosen independently for different CNUs 140, even within the same cable plant 150. For a respective CNU 140, an MCS is chosen to provide an adequate data rate (e.g., to maximize the data rate) based on the link quality for the CNU 140. Also, data rates can be improved or optimized with an appropriate assignment of resources. For example, in a cable plant 150, two CNUs 140 may see a frequency notch, but at different frequencies. Frequency resources are assigned such that each CNU 140 sees a good channel where its own data is transmitted.

Each media converter 130 filters packets (e.g., with corresponding frames, such as Ethernet frames) from the OLT 110 so that only frames addressed to any of the registered CNUs 140 coupled to the converter 130 are forwarded. The media converter 130 builds and manages a filtering template to select the frames to be forwarded. The filtering is based, for example, on the logical link identifier (LLID) encapsulated in the preamble of the frame.

Figure 2:
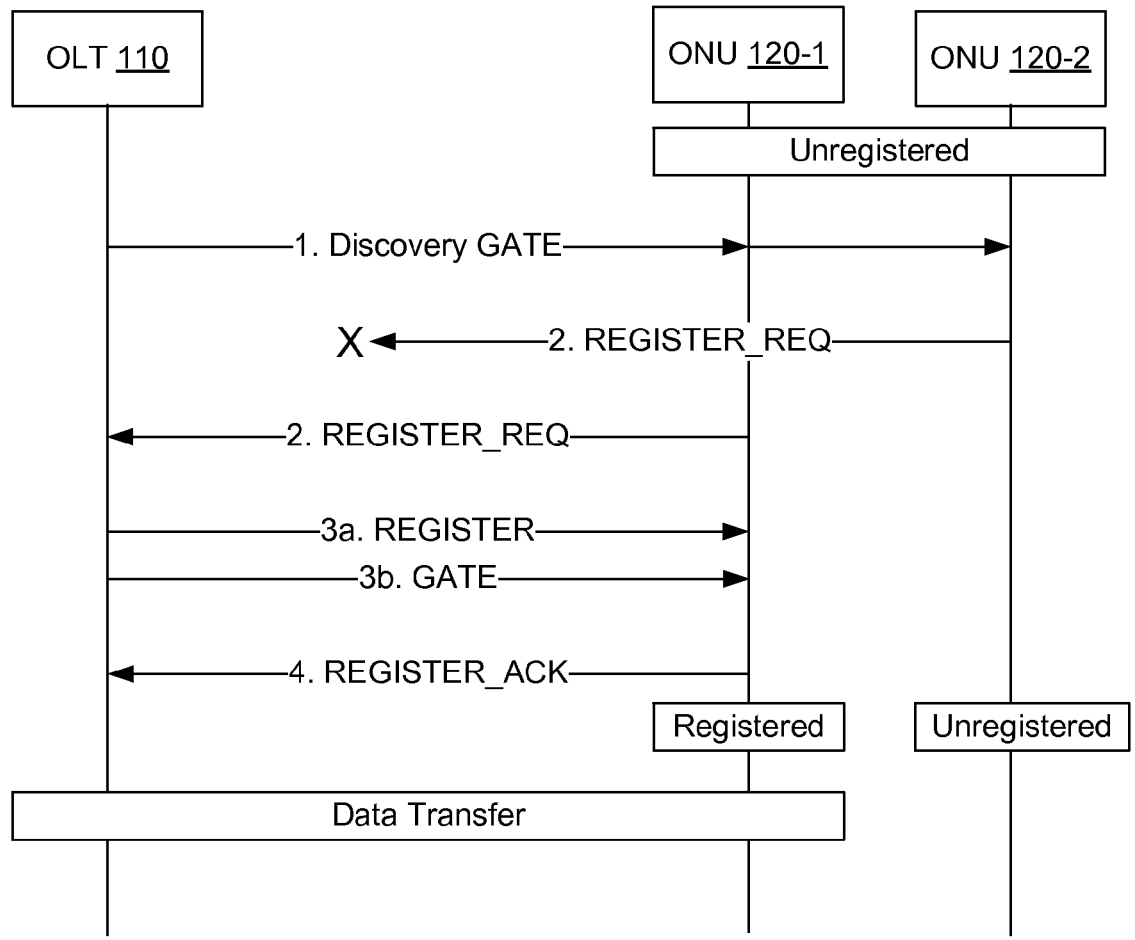
FIG. 2 illustrates an auto-discovery procedure between an optical line terminal and optical network units.

To build and manage the filtering template, the media converter may exploit an auto-discovery procedure for network units (e.g., the EPON multi-point control protocol (MPCP), as standardized in the IEEE 802.3 Ethernet standard) in which messages (e.g., MPCP messages) are transmitted between the network units. FIG. 2 illustrates this auto-discovery procedure as performed for the OLT 110 and ONUs 120-1 and 120-2. At the beginning of this procedure, ONU 120-1 and ONU 120-2 are both unregistered with the OLT 110. The OLT 110 periodically distributes special GATE messages, called discovery GATE messages, to trigger registration of unregistered network units. At step 1 of the procedure, the OLT 110 distributes one of these discovery GATE messages. At step 2, unregistered ONUs 120-1 and 120-2 attempt to register, competing for upstream transmission by replying with a registration request (REGISTER_REQ) message. (The same message can also be issued by an ONU to unregister.) In the example of FIG. 2, the ONU 120-1 succeeds in transmitting its REGISTER_REQ message to the OLT 110, but the ONU 120-2 fails. When the OLT 110 decodes the REGISTER_REQ message from the ONU 120-1, it replies to the ONU 120-1 (at step 3a) with a registration (REGISTER) message that assigns a unique LLID to the ONU 120-1, and immediately sends a unicast GATE message to the ONU 120-1 (at step 3b). (The OLT 110 can also instruct the ONU 120-1 to unregister.) The ONU 120-1 replies at step 4 with a registration acknowledgment (REGISTER_ACK) message to complete registration or with a non-acknowledgment (NACK) message if registration fails. Once the OLT 110 receives REGISTER_ACK, the ONU 120-1 is registered with the OLT 110, but the ONU 120-2 remains unregistered. Data transfer now can occur between the OLT 110 and ONU 120-1. The ONU 120-2 can attempt to register again in response to a subsequent discovery GATE message.

Figure 3:
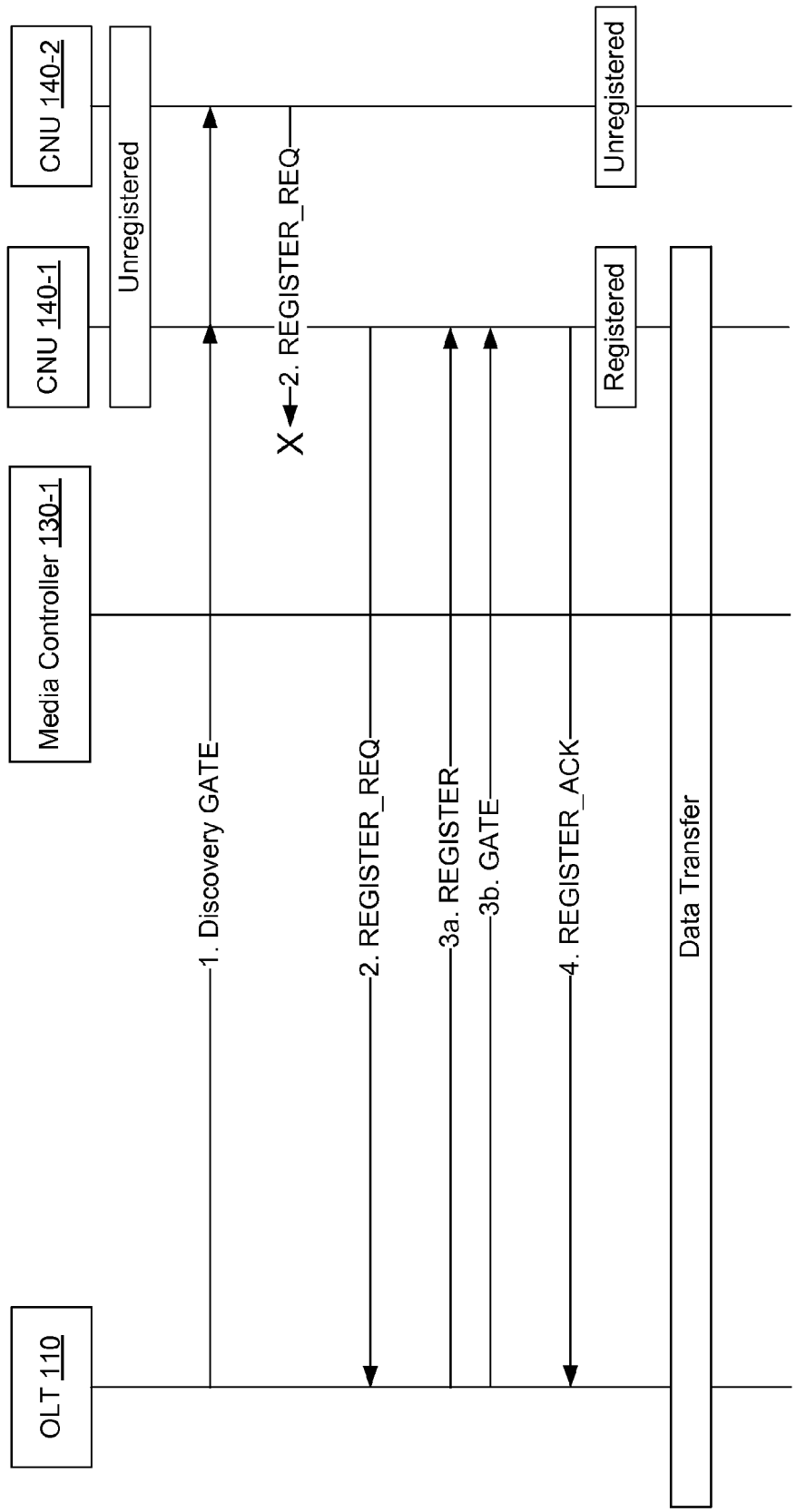
FIG. 3 illustrates an auto-discovery procedure between an optical line terminal and coax network units in accordance with some embodiments.

An analogous procedure to that of FIG. 2 is performed to register CNUs 140, as illustrated in FIG. 3 in accordance with some embodiments. In the procedure of FIG. 3, the messages are transmitted between the OLT 110 and CNUs 140-1 and 140-2 through the media converter 130-1. The media converter 130-1 monitors the messages, detects the LLIDs, and updates its filter template accordingly. When a CNU 140 registers with the OLT 110, the media converter 130-1 adds the LLID for the CNU 140 to the filter template. If the media converter 130-1 subsequently receives a packet specifying that LLID, it forwards the packet. (In some embodiments, an LLID also is added to the list of LLIDs in the filter template in response to upstream transmission of a data packet to the media converter 130-1 from a CNU 140 that is not listed in the filter template.) When a CNU 140 unregisters, the media converter 130-1 removes the LLID for the CNU 140 from the filter template. If the media converter 130-1 subsequently receives a packet specifying that LLID, it discards the packet and does not forward it. The media converter 130-1 thereby performs a packet sniffing and filtering process to determine whether to forward or discard packets.

The media converter 130-1 thus tracks registration and deregistration events, as indicated by corresponding messages (e.g., MPCP messages), for CNUs 140 in its domain (e.g., on its cable plant 150-1), and updates the filter template accordingly.

In some embodiments, to monitor the messages shown in FIG. 3, the media converter 130-1 reads all frames of 64-byte size and extracts MPCP frames by checking the type. To do this, the media converter 130-1 opens the frames. The messages are parsed in the media converter 130-1 by filtering on preambles for CNU data. Table 1 illustrates various fields for a frame. The media converter 130-1 analyzes respective fields to determine the message type corresponding to the frame. In the example of Table 1, the Length/Type data (88-08) indicates an MPCP message, the opcode (02) indicates a GATE message, and the number of grants/flags (09) indicates a Discovery message.

TABLE 1

Preamble - broadcast
Destination Address (DA)
Source Address (SA)
Length/Type = 88-08
Opcode = 00-02
Time Stamp
Number of grants/flags = 09
Grant start time
Grant length TABLE 1-continued Sync time
Pad = 00
Frame check sequence For example, if a discovery GATE message is detected in step 1 of FIG. 3, the media converter 130 recognizes that a registration process has begun. If a subsequent REGISTER_REQ message is received in step 2 of FIG. 3, as identified by its frame size (e.g., 64 bytes), message type (e.g., 88-08) and opcode (e.g., 04), then the media converter 130 stores a record of this message along with the source address of the CNU 140 that sent the message. If a REGISTER message is then received in step 3a of FIG. 3 for a CNU 140 with a destination address equal to the source address of the REGISTER_REQ message, the media converter 130 stores the LLID specified in the REGISTER message and associates the LLID with the source address of the REGISTER_REQ message. In some embodiments, the REGISTER message is identified by its frame size (e.g., 64 bytes), message type (e.g., 88-08) and opcode (e.g., 05). Upon receipt of a subsequent REGISTER_ACK message in step 4 of FIG. 3 (e.g., as identified by a frame size of 64 bytes, a message type of 88-08, an opcode of 06, and a source address equal to the source address of the REGISTER_REQ message), the LLID and associated source address for the newly registered CNU 140 are added to the filter template.

Figure 4:
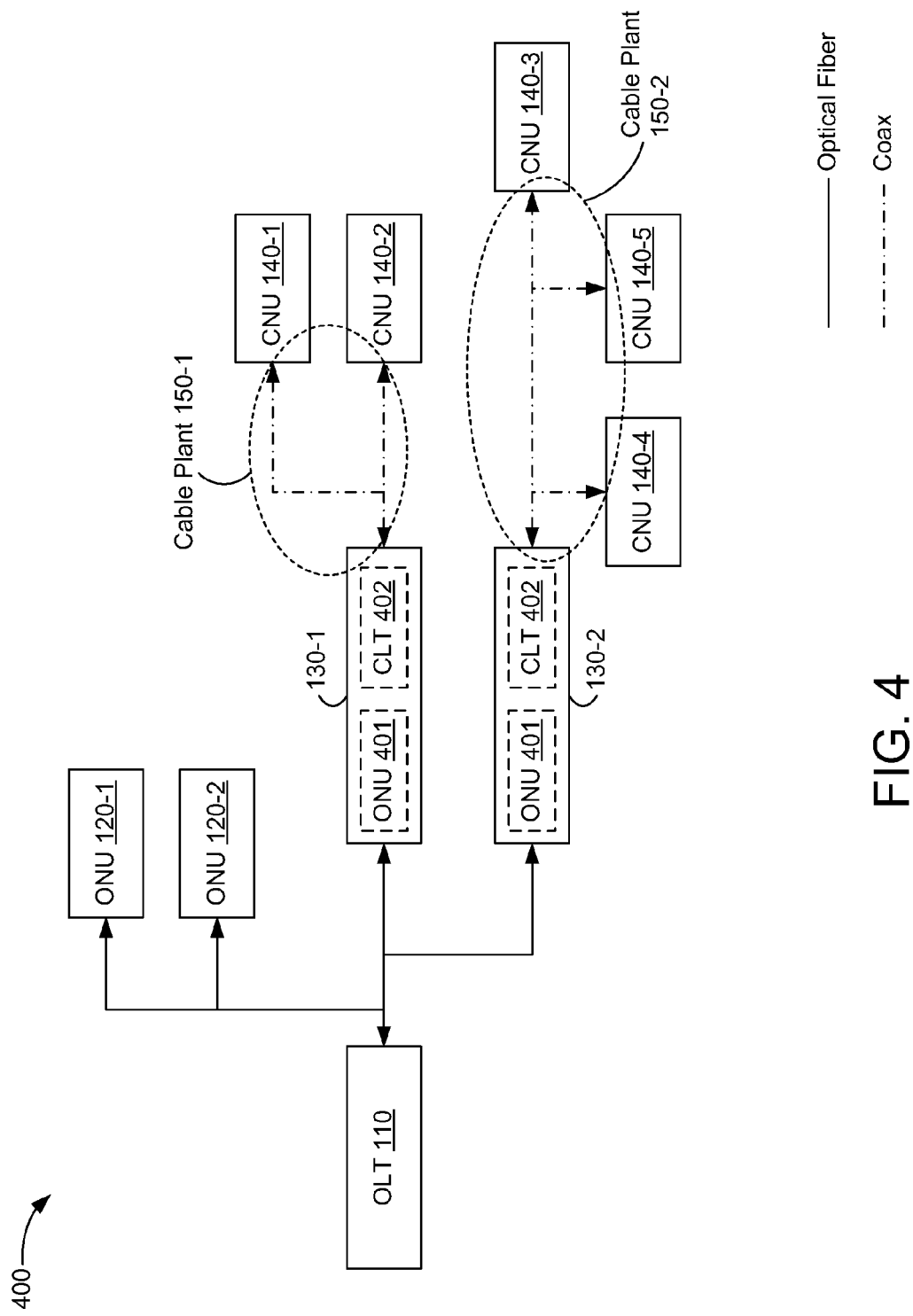
FIG. 4 is a block diagram of a network that includes both optical fiber links and coax links and has a two-network architecture.

Attention is now directed to resource allocation in a network that includes both optical fiber links and coax links. FIG. 4 illustrates a network 400 that is an example of the network 100 (FIG. 1). In the network 400, each media converter 130 is implemented as an ONU 401 coupled back-to-back with a coax line terminal (CLT) 402 without any coordination of resource allocation between the ONU 401 and CLT 402. The ONU 401 receives downstream packet transmissions from the OLT 110 and provides them to the CLT 402. The CLT 402 filters out packets that are not addressed to CNUs 140 in its cable plant 150 and forwards the remaining packets to the CNUs 140 in its cable plant 150. The CLT 402 also receives upstream packet transmissions for CNUs 140 in its cable plant 150 and provides these to the ONU 401, which transmits them to the OLT 110.

Because resource allocation is not coordinated between the ONU 401 and CLT 402, the network 400 has the disadvantage that resource allocation for coax links in a respective cable plant 150 is independent of resource allocation over the optical links. The network 400 thus does not allow for joint resource allocation between coax and optical links. As such, the network 400 is referred to as a two-network architecture.

Figure 5A:
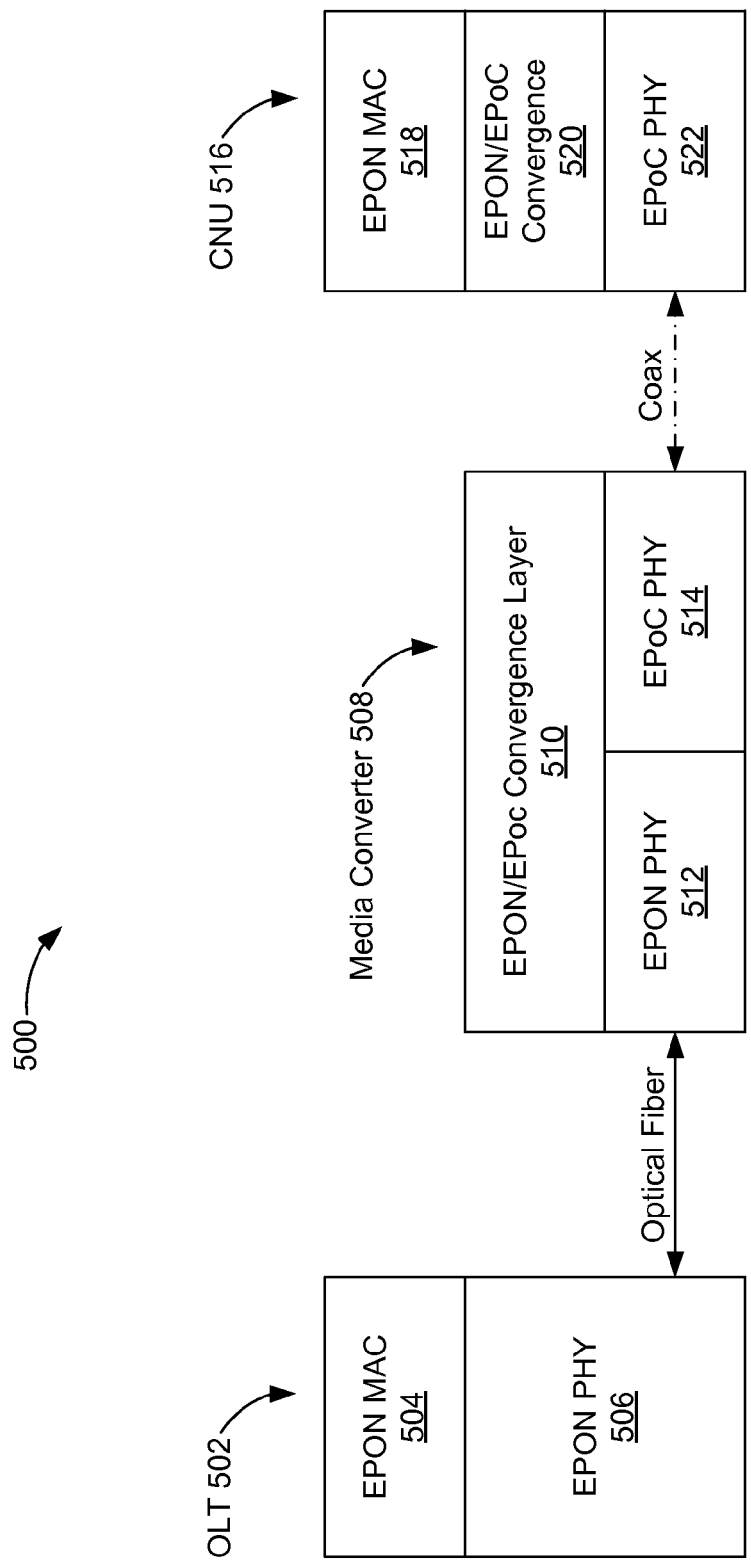
FIG. 5A is a block diagram of a first example of a network that includes both optical fiber links and coax links and has a one-network architecture in accordance with some embodiments.

Two examples of one-network architectures that allow for joint resource allocation between coax and optical links are now disclosed. FIG. 5A is a block diagram of a first one-network architecture 500 in accordance with some embodiments. In the architecture 500, an OLT 502 is coupled to a CNU 516 through a media converter 508. The OLT 502, media converter 508, and CNU 516 are respectively examples of an OLT 110, media converter 130, and CNU 140 (FIG. 1). While FIG. 5A only shows a single media converter 508 and CNU 516 for visual clarity, in practice the architecture 500 may include multiple media converters 508 coupled to the OLT 502, and each media converter 508 is coupled to a plurality of CNUs 516 through coax links.

In the architecture 500, each CNU 516 includes an implementation (also referred to as an instantiation) of an optical media access control (MAC) layer (e.g., an Ethernet MAC layer that includes an EPON MPCP sublayer and is thus referred to herein as an EPON MAC layer) 518. The implementation of the MAC layer 518 is also referred to as a media access controller 518 or MAC 518. Each CNU 516 also includes a coax physical layer (PHY) device (e.g., an EPoC PHY, where EPoC refers to an EPON-compatible protocol over coax) 522 to transmit and receive signals via the coax link that couples the CNU 516 to the media converter 508. (The terms MAC and PHY may respectively refer to a media access control layer and physical layer in the abstract, or to an implementation of a media access control layer and physical layer, depending on the context.) Each CNU 516 further includes an implementation (or instantiation) of an optical-to-coax convergence layer 520 that interfaces between the coax PHY 522 and the optical MAC 518. In some embodiments, the optical-to-coax convergence layer 520 is an EPON-to-EPoC convergence layer.

The media converter 508 includes an optical PHY (e.g., an EPON PHY) 512 to transmit and receive signals via the optical link that couples the media converter 508 to the OLT 502, and a coax PHY (e.g., an EPoC PHY) 514 to transmit and receive signals via the coax link that couples the media converter 508 to the CNU 516. The media converter 508 also includes an implementation (or instantiation) of an optical-to-coax convergence layer 510 that interfaces between the optical PHY 512 and coax PHY 514. The convergence layer 510 manages transactions between the optical PHY 512 at the media converter 508 and the optical MAC 518 at the CNU 516.

The OLT 502 includes an optical PHY (e.g., an EPON PHY) 506 to transmit and receive signals via the optical link that couples the OLT 502 to the media converter 508. The OLT 502 also includes an optical MAC (e.g., an EPON MAC) 504.

Figure 5B:
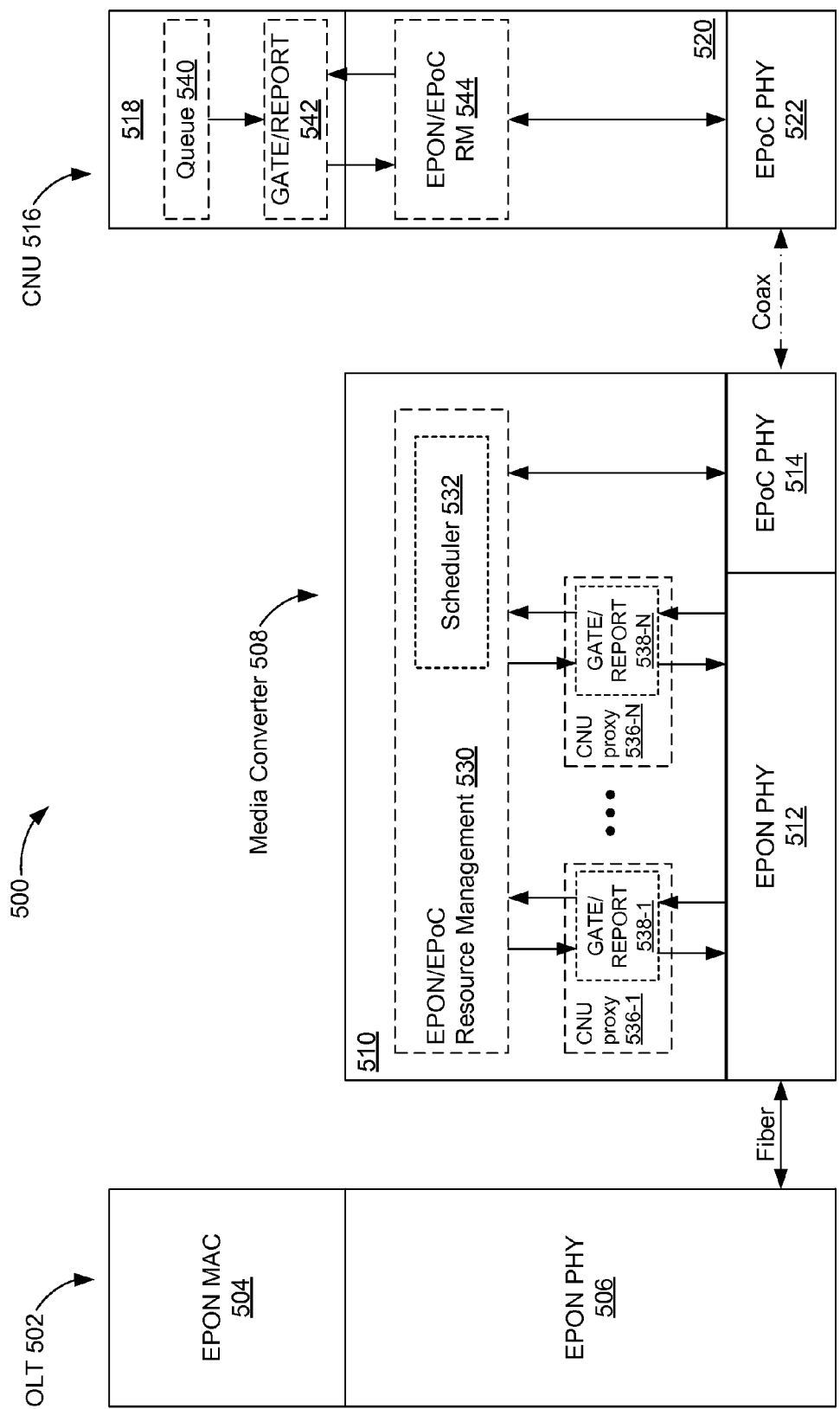
FIG. 5B is a more detailed block diagram of the network of FIG. 5A.

FIG. 5B is a more detailed block diagram of the one-network architecture 500 of FIG. 5A in accordance with some embodiments. As shown in FIG. 5B, the convergence layer 510 in the media converter 508 includes a plurality of CNU proxies 536-1 through 536-N, where N is the number of CNUs (e.g., registered CNUs) 516 in the corresponding cable plant 150 (FIG. 1). Each proxy 536 thus corresponds to a respective CNU 516. In some embodiments, the proxies 536 are used to convey EPON MAC functions over coax. For example, the proxies 536 perform time stamping, REPORT/GATE message processing, registration and deregistration, and packet filtering/forwarding on a per-CNU basis. In the architecture 500, the presence of an optical MAC 518 in the CNU 516 means that a virtual ONU resides in each CNU 516. The proxies 536 provide interfaces to these virtual ONUs.

The convergence layer 510 also includes a resource manager 530, and the convergence layer 520 in the CNU 516 includes a corresponding resource manager (RM) 544. A queue 540 in the optical MAC 518 of the CNU 516 queues packets for upstream transmission to the OLT 502. The queue 540 reports its status (including, for example, the number of queued packets and thus its length) to a message processing element 542 in the optical MAC 518, which sends a REPORT message reporting the queue status to the resource manager 544 of the convergence layer 520. The resource manager 544 sends the REPORT message to the resource manager 530 in the convergence layer 510 of the media converter 508, which forwards the REPORT message to the proxy 536 corresponding to the CNU 516 that sent the REPORT message. The proxy 536 captures the REPORT message in a message processing element 538 and updates its record of the queue status, and also transmits the REPORT message upstream to the OLT 502.

The OLT 502 determines resource allocation over the optical link (e.g., in accordance with received REPORT messages) and transmits GATE messages allocating the resources. The message processing elements 538 of the proxies 536 capture GATE messages corresponding to their respective CNUs 516 and request coax resources from the resource manager 530. The resource manager 530 allocates coax resources (e.g., using its scheduler 532) and transmits GATE messages allocating the resources to the resource manager 544 in the CNU 516, which forwards the GATE messages to the message processing element 542 of the optical MAC 518. The optical MAC 518 at the CNU 516 thus is instructed to employ the coax resources allocated to it. Packets are transmitted from the CNU 516 to the OLT 502 in accordance with the allocated coax and optical fiber resources, with buffering performed as needed by the convergence layer 510 in the media converter 508. In some embodiments, coax packets are larger than optical packets, and the convergence layer 510 breaks a single coax packet into multiple optical packets for upstream transmission to the OLT 502.

In some embodiments, the architecture 500 is implemented as a single multi-point domain, in which the scheduler 532 in the convergence layer 510 is implemented as a slave of the OLT 502. The OLT 502 allocates timeslots for transmissions over the optical fiber link (e.g., as specified by GATE messages), and the scheduler 532 allocates coax resources based on the allocated optical timeslots. In other embodiments, the architecture 500 is implemented as a double multi-point domain, in which the scheduler 532 monitors queue lengths for respective CNUs 516 and allocates coax resources accordingly. For example, the proxies 536 report the queue lengths of their respective CNUs 516 to the scheduler 532, which allocates coax resources accordingly. In either case, the convergence layer 510 provides consistency between optical fiber resource allocation and coax resource allocation. For double multi-point domain architectures, the convergence layer 510 infers the optical fiber resource allocation based on queue lengths.

Figure 6A:
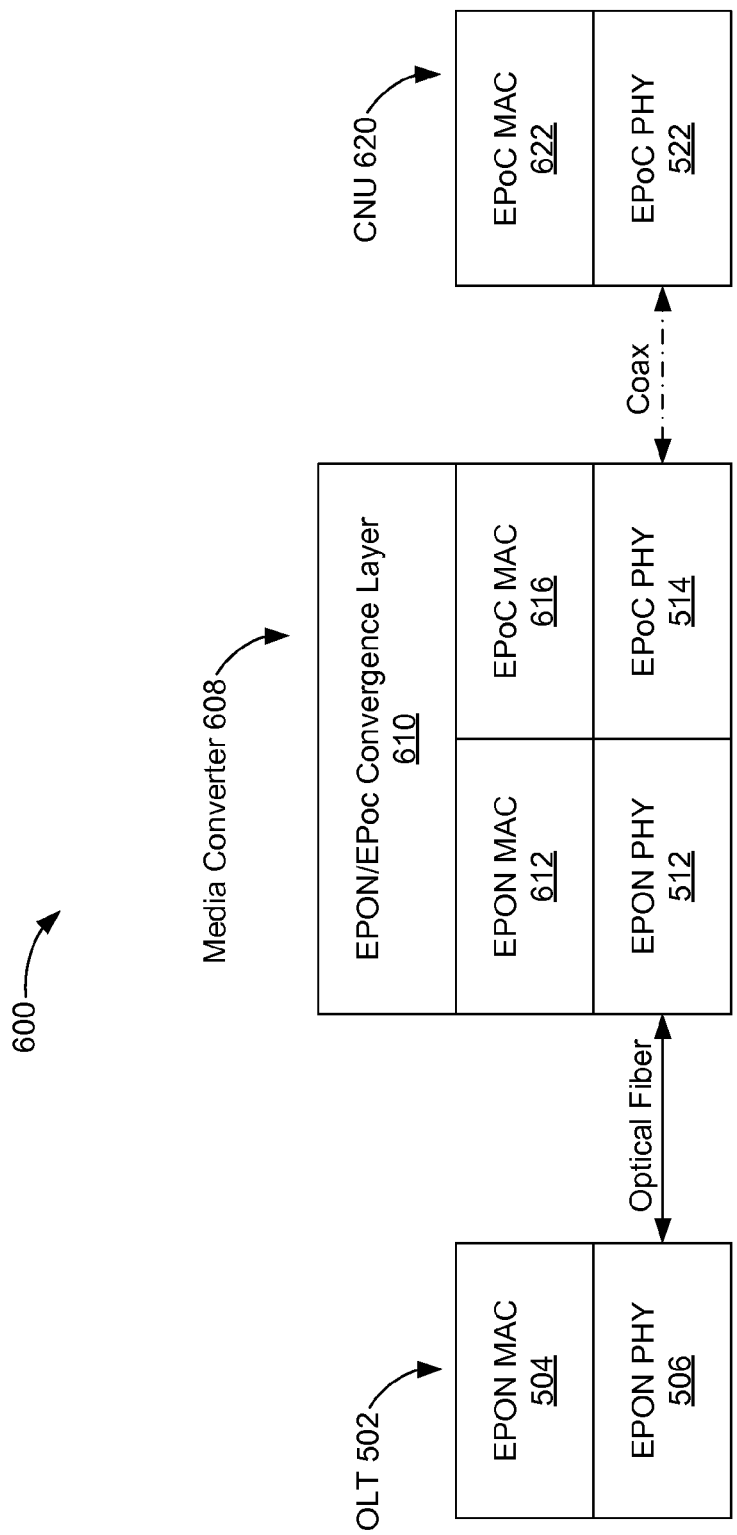
FIG. 6A is a block diagram of a second example of a network that includes both optical fiber links and coax links and has a one-network architecture in accordance with some embodiments.

FIG. 6A is a block diagram of a second one-network architecture 600 in accordance with some embodiments. In the architecture 600, an OLT 502 is coupled to a CNU 620 through a media converter 608. The OLT 502, media converter 608, and CNU 620 are respectively examples of an OLT 110, media converter 130, and CNU 140 (FIG. 1). While FIG. 6A only shows a single media converter 608 and CNU 620 for visual clarity, in practice the architecture 600 may include multiple media converters 608 coupled to the OLT 502, and each media converter 608 is coupled to a plurality of CNUs 620 through coax links.

The media converter 608 includes implementations (or instantiations) of an optical MAC (e.g., EPON MAC) layer 612, an optical-to-coax (e.g., EPON/EPoC) convergence layer 610, and a coax (e.g., EPoC) MAC layer 616, in addition to optical and coax PHYs 512 and 514. The convergence layer 610 manages transactions between the optical MAC 612 and the coax MAC 616; it performs this management through the standard interfaces of the optical MAC 612 and the coax MAC 616. The CNU 620 does not include an optical MAC and corresponding convergence layer as for the CNU 516 (FIG. 5A), but instead includes an implementation of a coax (e.g., EPoC) MAC layer 622 coupled to a coax PHY 522. Because the optical MAC layer 612 is implemented in the media converter 608, a virtual ONU for each of the CNUs 620 in a corresponding cable plant 150 (FIG. 1) resides at the media converter 608. In addition, the media converter 608 itself may also be associated with a virtual ONU. Further-more, because a coax MAC layer 616 is implemented in the media converter 608, a virtual CLT resides at the media converter 608.

Figure 6B:
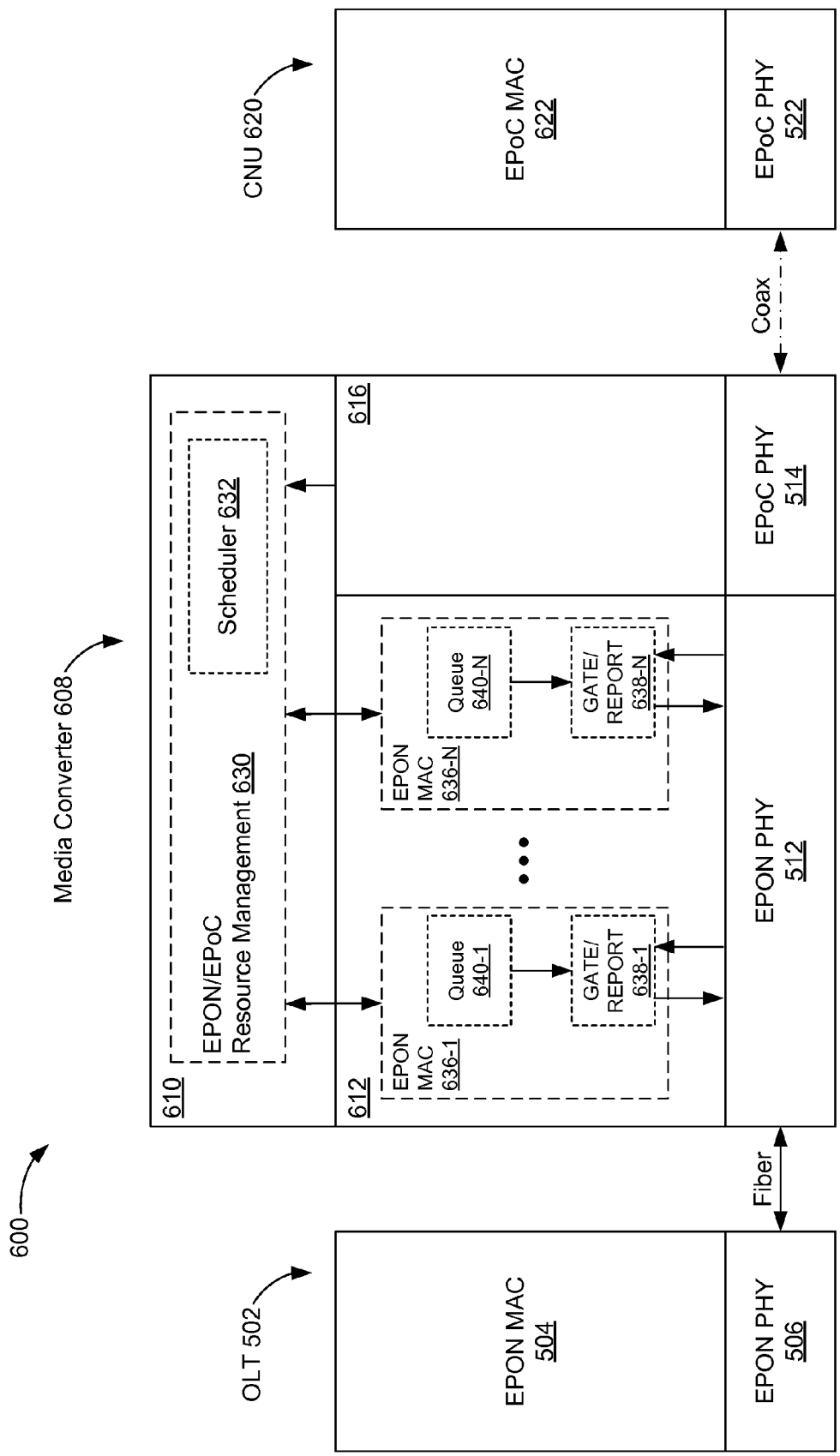
FIG. 6B is a more detailed block diagram of the network of FIG. 6A.

FIG. 6B is a more detailed block diagram of the one-network architecture 600 of FIG. 6A in accordance with some embodiments. As shown in FIG. 6B, the optical MAC 612 includes implementations of optical (e.g., EPON) MAC layers 636-1 through 636-N for each of the N CNUs 620 in the corresponding cable plant 150 (FIG. 1). Each of these optical MAC entities 636 includes a queue 640 for buffering upstream packet transmissions from the corresponding CNU 620 and a message processing unit 638 for processing messages from the corresponding CNU 620. The convergence layer 610 includes a resource manager 630 with a scheduler 632.

The queue 640 in each optical MAC entity 636 reports its status (e.g., its length, and thus the number of pending packets) to the corresponding message processing unit 638, which sends REPORT messages reporting the queue status to the OLT 502. The message processing unit 638 also receives GATE messages specifying optical fiber resource allocation from the OLT 502 (via the optical PHY 512) and instructs its MAC entity 636 to transmit upstream packets in accordance with the resource allocation specified by the GATE messages. (In some embodiments, the EPON MAC entities 636 also perform the time stamping, registration and de-registration, and packet filtering and forwarding functions discussed with regard to the convergence layer 510 of FIG. 5A).

The scheduler 632 monitors the status (e.g., the lengths) of the queues 640 and allocates coax resources accordingly. For example, the scheduler 632 sends messages to the coax MAC entity 622 in the CNU 620 instructing it to transmit upstream packets in accordance with the coax resource allocation. These packets are queued in the corresponding queue 640 in the media converter 608 for further upstream transmission to the OLT 502. The architecture 600 thus is a double multi-point domain architecture: the convergence layer 610 infers the optical fiber resource allocation based on queue lengths.

In some embodiments, coax packets are larger than optical packets, and the convergence layer 610 breaks a single coax packet into multiple optical packets for buffering in the queues 640 and upstream transmission to the OLT 502.

Figure 7:
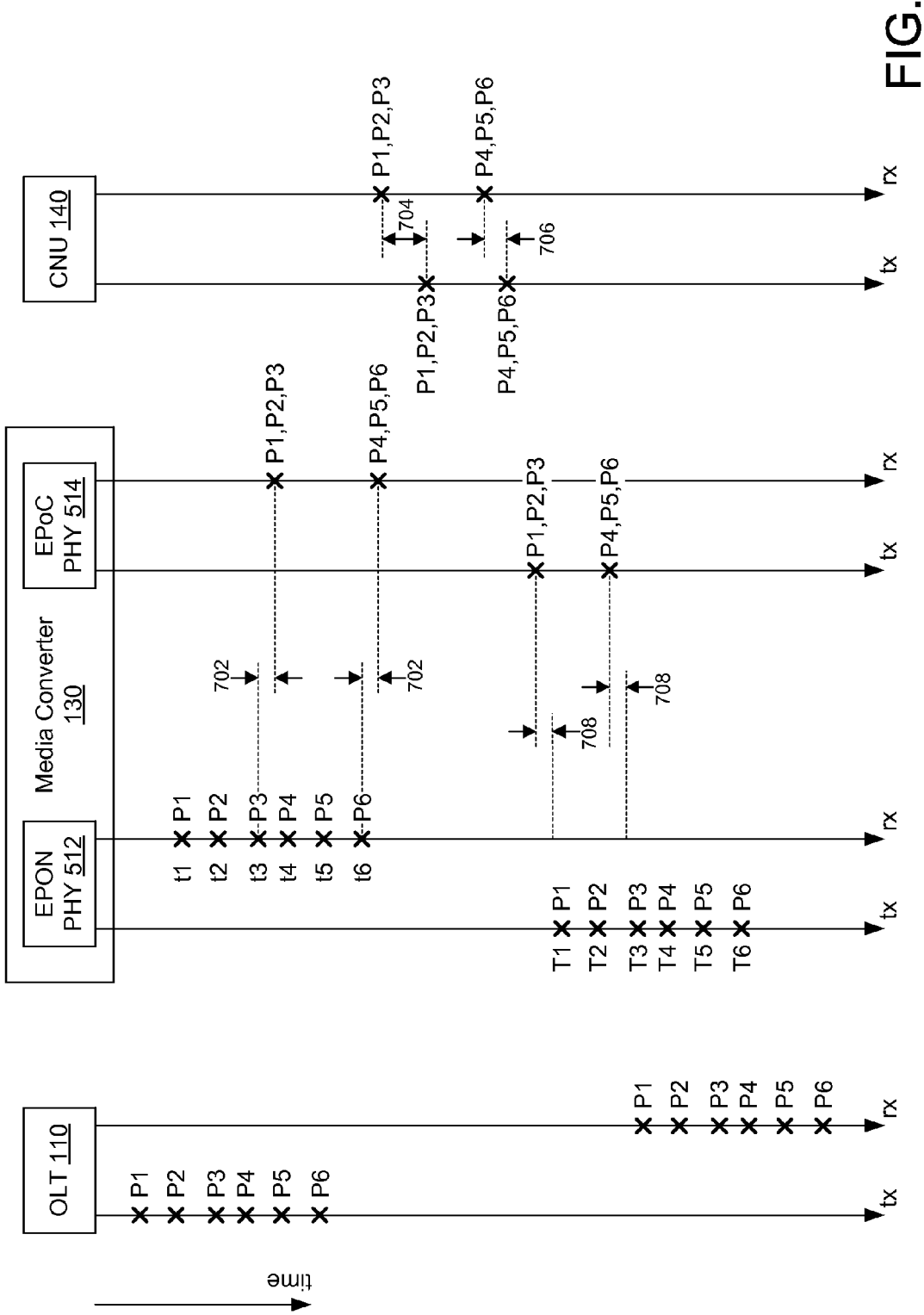
FIG. 7 illustrates timing synchronizations in a network that includes both optical fiber links and coax links in accordance with some embodiments.

FIG. 7 illustrates timing synchronizations in accordance with some embodiments. Round-trip times are shown for transmissions from an OLT 110 (FIG. 1), through a media converter 130 (e.g., media converter 130-1 or 130-2, FIG. 1), to a CNU 140 (e.g., one of the CNUs 140-1 through 140-5, FIG. 1) and back through the media converter 130 to the OLT 110. For each of these elements, transmission times are marked on the corresponding "tx" timeline and reception times are marked on the corresponding "rx" timeline. P1 through P6 label respective packets transmitted from the OLT 110 and their corresponding response packets. The media converter 130 includes an optical PHY 512 (FIGS. 5A-5B and 6A-6B) for transmitting and receiving optical packets and a coax PHY 514 (FIGS. 5A-5B and 6A-6B) for transmitting and receiving coax packets. In some embodiments, the media converter 130 is host to a virtual ONU and a virtual CLT; the optical PHY 512 is associated with the virtual ONU and the coax PHY 514 is associated with the virtual CLT. Packets P1-P6 are transmitted from the OLT 110 at the times shown and received at the media converter 130 at times t1-t6. The media converter 130 combines packets P1, P2, and P3 into a single packet, which it transmits to the CNU 140 at a time subsequent to t3; the delay 702 between t3 and the time of transmission of the combined packet to the CNU 140 corresponds to a processing delay in the media converter 130. Likewise, the media converter 130 combines packets P4, P5, and P6 into a single packet, which it transmits to the CNU 140 at a time equal to t6 plus the processing delay 702. In some embodiments, the convergence layer 510 (FIGS. 5A-5B) or 610 (FIGS. 6A-6B) in the media converter 130 combines the packets.

After receiving the combined packet P1, P2, and P3, the CNU 140 waits for a grant of resource allocation on the coax link that couples the CNU 140 to the coax PHY 514. This waiting results in a delay 704. Upon receiving the grant, the CNU 140 transmits the combined response packet P1, P2, and P3, which is subsequently received at the media converter 130. After a processing delay 708 at the media converter, the packets P1, P2, and P3 are available for individual transmission over the optical link to the OLT 110. Likewise, after receiving the combined packet P4, P5, and P6, the CNU 140 waits for another grant of resource allocation on the coax link. This waiting results in a delay 706. Upon receiving this grant, the CNU 140 transmits the combined response packet P4, P5, and P6, which is subsequently received at the media converter 130. After a processing delay 708 at the media converter 130, the packets P4, P5, and P6 are available for individual transmission over the optical link to the OLT 110. In some embodiments, the convergence layer 510 (FIGS. 5A-5B) or 610 (FIGS. 6A-6B) in the media converter 130 divides the coax packet that combines P1, P2, and P3 into separate optical packets P1, P2, and p3, and divides the coax packet that combines P4, P5, and P6 into separate optical packets P4, P5, and P6.

The packets P1-P6 are transmitted from the media converter 130 at times T1-T6 (e.g., in accordance with optical link resource allocation as specified by the OLT 110) and are subsequently received at the OLT 110 as shown. The packets are available for transmission to the OLT 110 after their associated processing time 708 in the media converter 130 has expired, but are delayed until the times of their respective allocated timeslots on the optical link. The times T1-T6 are respectively equal to times t1-t6 plus the maximal round trip time associated with the coax link (referred to as tcoax), which includes the various delays that have been described.

Figure 8:
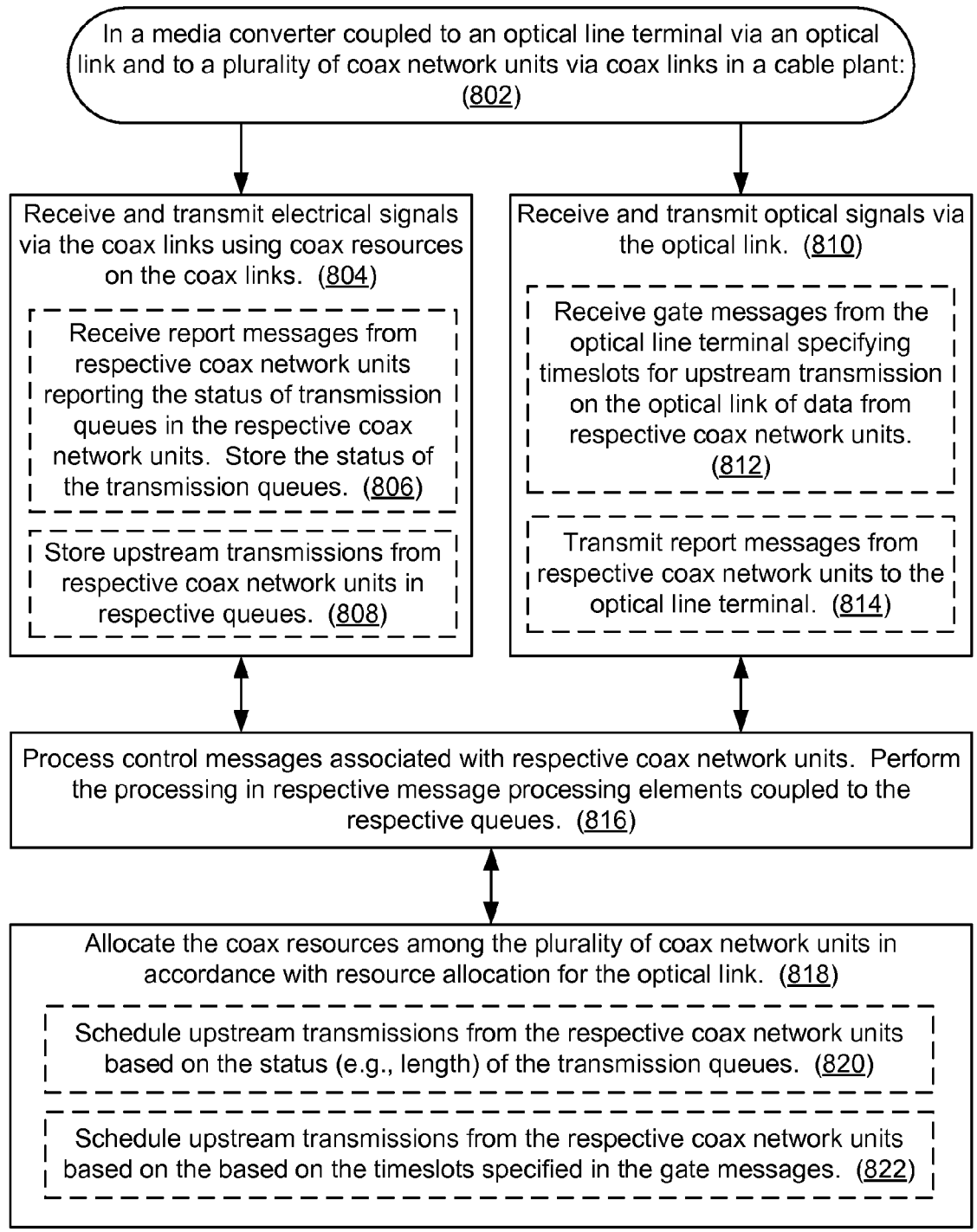
FIG. 8 is a flowchart illustrating a method of operating a media converter in accordance with some embodiments.

FIG. 8 is a flowchart illustrating a method 800 of operating a media converter 130 (e.g., one of the media converters 130-1 or 130-2, FIG. 1) in accordance with some embodiments. The media converter 130 is coupled (802) to an OLT 110 (FIG. 1) via an optical link and to a plurality of CNUs 140 (e.g., CNUs 140-1 and 140-2 or 140-3 through 140-5, FIG. 1) via coax links in a cable plant 150 (e.g., cable plant 150-1 or 150-2, FIG. 1).

Electrical signals are received and transmitted (804) via the coax links using coax resources on the coax links. The electrical signals are received and transmitted by a coax PHY 514 (FIGS. 5A-5B and 6A-6B).

In some embodiments, report messages (e.g., MPCP REPORT messages) are received (806) from respective CNUs 140. The report messages report the status of transmission queues (e.g., queues 540, FIG. 5B) in the respective CNUs 140. The status of the transmission queues as reported by the report messages is stored, for example, in respective proxies 536, FIG. 5B.

In some embodiments, upstream transmissions from respective CNUs 140 are stored (808) in respective queues (e.g., queues 640, FIG. 6B) in the media converter 130.

Optical signals are received and transmitted (810) via the optical link. The optical signals are received and transmitted by an optical PHY 512 (FIGS. 5A-5B and 6A-6B).

In some embodiments, gate messages (e.g., MPCP GATE messages) are received (812) from the OLT 110 specifying timeslots for upstream transmission on the optical link of data from respective CNUs 140. In some embodiments, report messages from respective CNUs 140 are transmitted (814) to the OLT 110: the media converter 130 forwards report messages from the respective CNUs 140 to the OLT 110.

In some embodiments, control messages (e.g., report and/or gate messages) associated with respective CNUs 140 are processed (816) in respective message processing elements (e.g., elements 538, FIG. 5B, or 638, FIG. 6B). The message processing elements (e.g., elements 638, FIG. 6B) may be coupled to the respective queues (e.g., queues 640, FIG. 6B).

The coax resources are allocated (818) among the plurality of CNUs 140 in accordance with resource allocation for the optical link. In some embodiments, upstream transmissions from the respective CNUs 140 are scheduled (820) based on the status (e.g., length) of the transmission queues. For example, this scheduling is based on the lengths of queues 540 in CNUs 516 (FIG. 5B), as reported to respective proxies 536 (FIG. 5B). Alternatively, this scheduling is based on the lengths of queues 640 in the media converter 608 (FIG. 6B). In some embodiments, upstream transmissions from the respective coax network units are scheduled (822) based on the timeslots specified in the gate messages received from the OLT 110.

The method 800 thus allows for coordination of scheduling between optical and coax portions of the network 100 (FIG. 1), by allocating coax resources to respective CNUs 140 based either directly or indirectly on resource allocation for the optical link. Embodiments of the method 800 may be implemented in versions of the network 100 with a single multi-point domain architecture or a double multi-point domain architecture.

While the method 800 includes a number of operations that appear to occur in a specific order, it should be apparent that the method 800 can include more or fewer operations, which can be executed serially or in parallel. An order of two or more operations may be changed and two or more operations may be combined into a single operation.

Figure 9A:
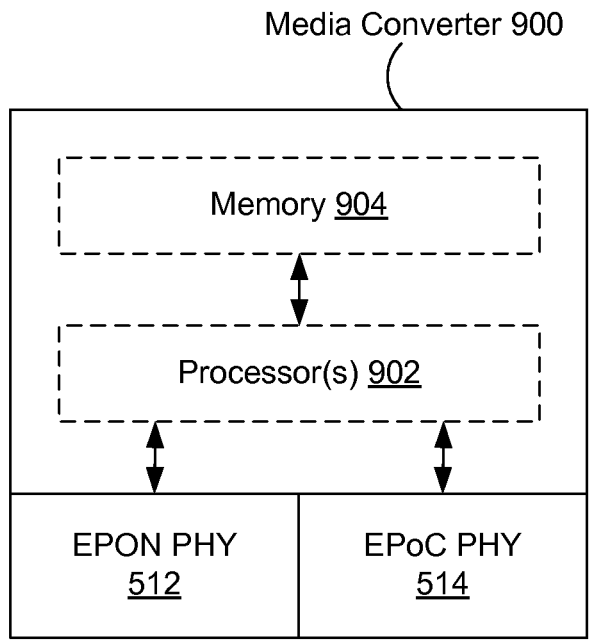
FIG. 9A is a block diagram of a media converter in accordance with some embodiments.

In some embodiments, the convergence layer 510 (FIGS. 5A-5B), convergence layer 520 (FIGS. 5A-5B), optical MAC 518 (FIGS. 5A-5B), optical MAC 612 (FIGS. 6A-6B), coax MACs 616 and 622 (FIGS. 6A-6B), and/or convergence layer 610 (FIGS. 6A-6B) are implemented in hardware, software, or a combination of hardware and software. For example, FIG. 9A is a block diagram of a media converter 900 in a network such as the network 100 (FIG. 1) in accordance with some embodiments. The media converter 900 is an example of the media converter 508 (FIGS. 5A-5B) or, alternatively, 608 (FIGS. 6A-6B), and thus of a media converter 130 (FIG. 1). In the media converter 900, the optical PHY 512 and coax PHY 514 are coupled to one or more processor cores 902, which are coupled in turn to memory 904. In some embodiments, the memory 904 includes a non-transitory computer-readable medium (e.g., one or more nonvolatile memory elements, such as EPROM, EEPROM, Flash memory, a hard disk drive, and so on) that stores instructions for execution by the one or more processor cores 902. In the example of the media converter 508 (FIGS. 5A-5B), the instructions include instructions that, when executed by the processor(s) 902, cause the media converter 900 to implement the functionality of the optical-to-coax convergence layer 510. In the example of the media converter 608 (FIGS. 6A-6B), the instructions include instructions that, when executed by the processor(s) 902, cause the media converter 900 to implement the functionality of the optical-to-coax convergence layer 610, the optical MAC 612, and/or the coax MAC 616. In some embodiments, the instructions include instructions that, when executed by the processor(s) 902, cause the media converter 900 to perform all or portion of the method 800 (FIG. 8).

While the memory 904 is shown as being separate from the processor core(s) 902, all or a portion of the memory 904 may be embedded in the processor(s) 902. In some embodiments, the processor(s) 902 and/or memory 904 are implemented in the same integrated circuit as the optical PHY 512 and/or coax PHY 514. For example, the coax PHY 514 may be integrated with the processor(s) 902 in a single chip, while the memory 904 and optical PHY 512 are implemented in separate chips. In another example, the elements 512, 514, 904, and 902 are all integrated in a single chip.

Figure 9B:
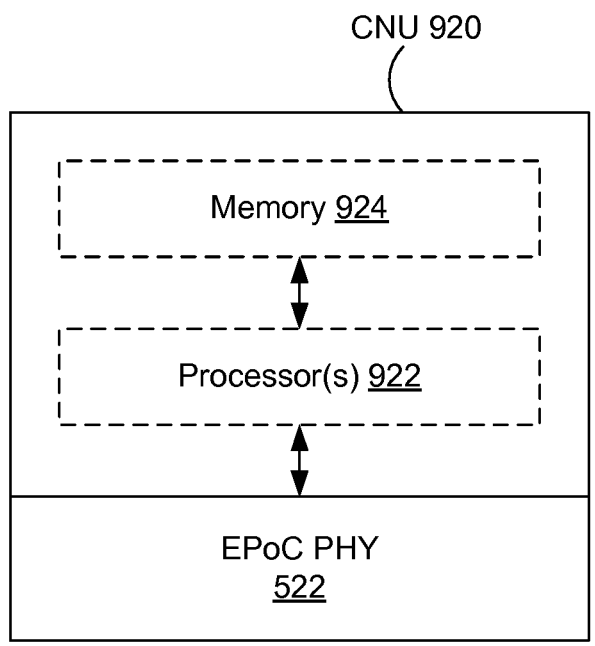
FIG. 9B is a block diagram of a coax network unit in accordance with some embodiments.

FIG. 9B is a block diagram of a CNU 920 in accordance with some embodiments. The CNU 920 is an example of the CNU 516 (FIG. 5A) and thus of a CNU 140 (FIG. 1). In the CNU 920, the coax PHY 522 is coupled to one or more processor cores 922, which are coupled in turn to memory 924. In some embodiments, the memory 924 includes a non-transitory computer-readable medium (e.g., one or more non-volatile memory elements, such as EPROM, EEPROM, Flash memory, a hard disk drive, and so on) that stores instructions for execution by the one or more processor cores 922. When executed by the processor core(s) 922, the instructions cause the CNU 920 to implement the functionality of the optical MAC entity 518 and/or the optical-to-coax convergence layer 520. In some embodiments, the instructions include instructions that, when executed by the processor(s) 922, cause the CNU 920 to transmit electrical signals received by a media converter in the method 800 (FIG. 8) and to process electrical signals transmitted by a media converter in the method 800 (FIG. 8).

While the memory 924 is shown as being separate from the processor core(s) 922, all or a portion of the memory 904 may be embedded in the processor(s) 922. In some embodiments, the processor(s) 922 and/or memory 924 are implemented in the same integrated circuit as the coax PHY 522. For example, the coax PHY 522 may be integrated with the processor(s) 922 in a single chip, which may or may not also include the memory 924.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A media converter to be coupled to an optical line terminal via an optical link and to a plurality of coax network units via coax links in a cable plant, the media converter comprising:
    an optical physical-layer device to receive and transmit optical signals via the optical link;
    a coax physical-layer device to receive and transmit electrical signals via the coax links; and
    an implementation of an optical-coax convergence layer to schedule transmissions of electrical signals from the plurality of coax network units by allocating coax resources among the plurality of coax network units in accordance with resource allocation for the optical link.

2. The media converter of claim 1, wherein:
    the implementation of the optical-coax convergence layer comprises a plurality of proxies, each corresponding to a respective coax network unit of the plurality of coax network units; and respective proxies of the plurality of proxies comprise respective message processing elements to process control messages associated with respective coax network units.

3. The media converter of claim 2, wherein:
the control messages comprise gate messages from the optical line terminal specifying timeslots for upstream transmission on the optical link of packets from the respective coax network units; and
the implementation of the optical-coax convergence layer further comprises a resource manager to allocate the coax resources based on the timeslots.

4. The media converter of claim 2, wherein the optical signals comprise packets and the respective proxies of the plurality of proxies are to filter out packets that are not addressed to their respective coax network units.

5. The media converter of claim 2, wherein:
the control messages comprise report messages from the respective coax network units reporting the status of transmission queues in the respective coax network units; and
each proxy is to store the status of the transmission queue of its respective coax network unit.

6. The media converter of claim 5, wherein the implementation of the optical-coax convergence layer further comprises a resource manager to allocate the coax resources based on the status of the transmission queues.

7. The media converter of claim 5, wherein the respective message processing elements are coupled to the optical physical-layer device to provide the report messages from the respective coax network units to the optical physical-layer device for transmission to the optical line terminal.

8. The media converter of claim 6, wherein the resource manager comprises a scheduler to schedule the transmissions from the plurality of coax network units based on the status of the transmission queues.

9. The media converter of claim 1, wherein the implementation of the optical-coax convergence layer comprises a resource manager to allocate the coax resources based on reports of the lengths of transmission queues in the plurality of coax network units, wherein the lengths of the transmission queues indicate the resource allocation for the optical link.

10. The media converter of claim 1, wherein the implementation of the optical-coax convergence layer comprises a resource manager to allocate the coax resources based on timeslot allocation on the optical link.

11. The media converter of claim 1, further comprising an optical media access controller (MAC) coupled between the optical physical-layer device and the implementation of the optical-coax convergence layer.

12. The media converter of claim 11, further comprising a coax MAC coupled between the coax physical-layer device and the implementation of the optical-coax convergence layer, wherein the implementation of the optical-coax convergence layer is to manage transactions between the optical MAC and the coax MAC.

13. The media converter of claim 11, wherein the optical MAC comprises a plurality of queues to store upstream transmissions from respective coax network units.

14. The media converter of claim 11, wherein the optical signals comprise packets and the optical MAC is to filter out packets not addressed to any coax network units of the plurality of coax network units.

15. The media converter of claim 13, wherein the implementation of the optical-coax convergence layer comprises a resource manager to allocate the coax resources based on lengths of respective queues of the plurality of queues of the optical MAC.

16. The media converter of claim 13, wherein the optical MAC further comprises a plurality of message processing elements, each coupled to a respective queue of the plurality of queues, each to process control messages associated with a respective coax network unit.

17. The media converter of claim 1, wherein the implementation of the optical-coax convergence layer is to divide a coax packet into a plurality of optical packets.

18. A method of operating a media converter coupled to an optical line terminal via an optical link and to a plurality of coax network units via coax links in a cable plant, the method comprising:
receiving and transmitting optical signals via the optical link;
receiving and transmitting electrical signals via the coax links; and
scheduling transmission of electrical signals from the plurality of coax network units, the scheduling comprising allocating coax resources among the plurality of coax network units in accordance with resource allocation for the optical link.

19. The method of claim 18, further comprising:
receiving report messages from respective coax network units of the plurality of coax network units reporting the status of transmission queues in the respective coax network units; and
storing the status of the transmission queues;
wherein the scheduling is based on the status of the transmission queues.

20. The method of claim 19, further comprising transmitting the report messages to the optical line terminal.

21. The method of claim 18, further comprising:
receiving gate messages from the optical line terminal specifying timeslots for upstream transmission on the optical link of data from respective coax network units;
wherein the scheduling is based on the timeslots.

22. The method of claim 18, further comprising storing upstream transmissions from respective coax network units in a plurality of respective queues.

23. The method of claim 22, wherein the scheduling is based on lengths of the respective queues.

24. The method of claim 22, further comprising processing control messages associated with the respective coax network units, wherein the processing is performed in respective message processing elements coupled to the respective queues.

25. The method of claim 18, wherein the optical signals comprise packets, and the method further comprises filtering out packets not addressed to any coax network units of the plurality of coax network units.

26. A media converter to be coupled to an optical line terminal via an optical link and to a plurality of coax network units via coax links in a cable plant, the media converter comprising:
an optical physical-layer device to receive and transmit optical signals via the optical link;
a coax physical-layer device to receive and transmit electrical signals via the coax links;
one or more processors; and
memory storing instructions that, when executed by the one or more processors, cause the media converter to schedule transmissions of electrical signals from the plurality of coax network units by allocating coax resources among the plurality of coax network units in accordance with resource allocation for the optical link.

* * * * *